April 24, 1934.        N. CAPOGRECO        1,956,491
COMBINATION BUMPER AND EMERGENCY BRAKE MECHANISM FOR MOTOR VEHICLES
Filed May 12, 1933
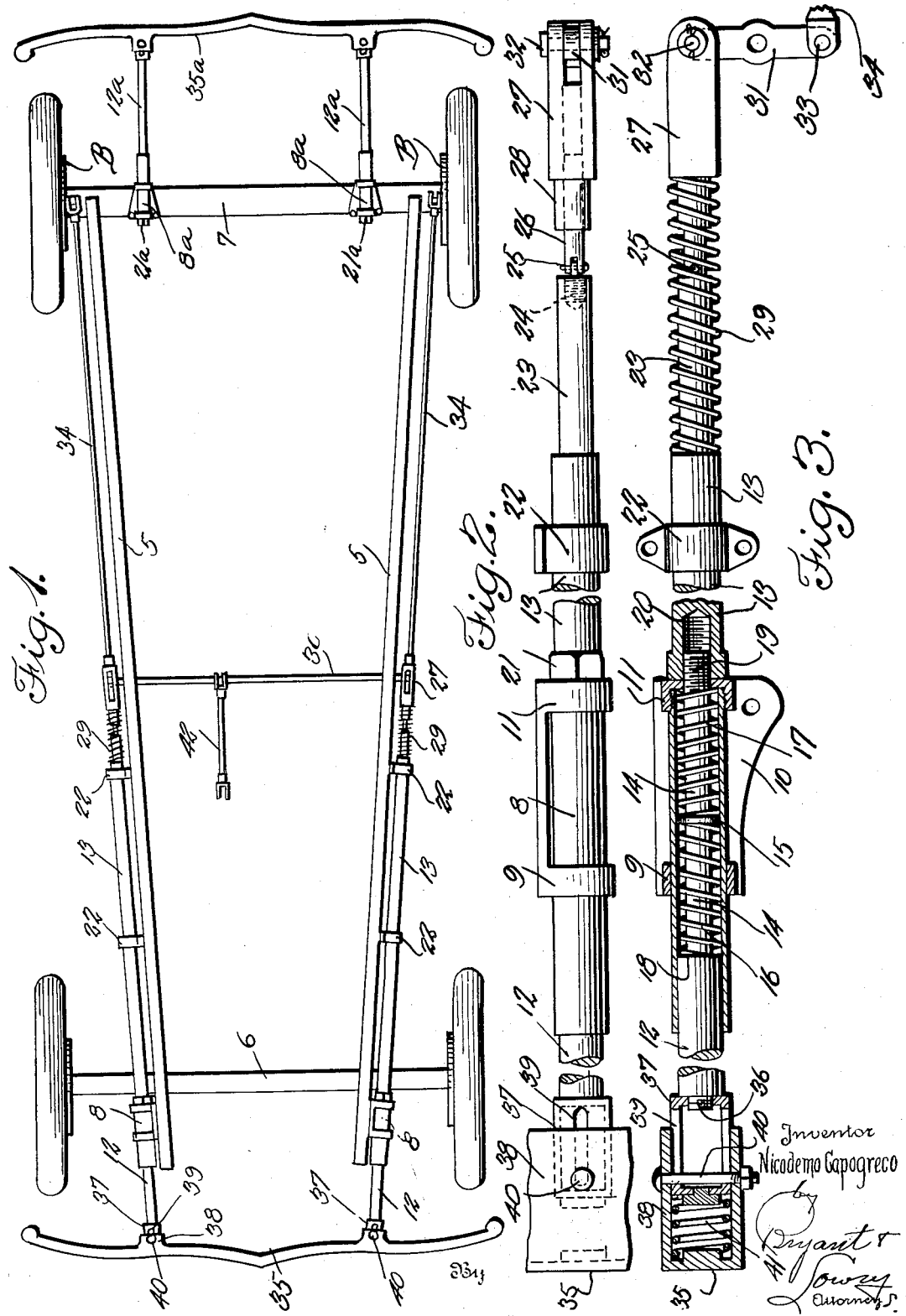
Inventor
Nicodemo Capogreco
by
Bryant & Towzy
Attorneys Patented Apr. 24, 1934

1,956,491

UNITED STATES PATENT OFFICE 1,956,491

COMBINATION BUMPER AND EMERGENCY BRAKE MECHANISM FOR MOTOR VEHICLES

Nicodemo Capogreco, East Boston, Mass.

Application May 12, 1933, Serial No. 670,791

7 Claims. (Cl. 180—83)

This invention relates to certain new and useful improvements in combination bumper and emergency brake mechanism for motor vehicles.

The primary object of the invention is to provide an emergency brake operating mechanism for motor vehicles automatically operated by the motor vehicle bumper so that in event of a collision or the like impacts absorbed by the bumper are transmitted to the brake mechanism for the application of the wheel brakes and also for releasing the clutch mechanism of the motor vehicle drive.

A further object of the invention is to provide apparatus of the foregoing character that is comparatively simple in construction and embodying shock absorbing elements interposed between the bumper bar and brake mechanism resulting in a cushioned application of the emergency brake mechanism.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a motor vehicle chassis with bumper operated emergency brake mechanism supported thereon;

Figure 2 is a fragmentary top plan view of the brake mechanism to be mounted on each chassis bar; and Figure 3 is a fragmentary side elevational view, partly in section, of the parts shown in Figure 2.

The automobile chassis as shown in Figure 1 comprises forwardly converging guide bars 5 supported on front and rear axles 6 and 7 respectively. The combination bumper and emergency brake mechanism is supported on the chassis bars 5 at the outer sides thereof and the mechanism supported on each chassis bar includes a cylindrical casing 8 inclosed by encircling straps 9 carried by a mounting plate 10 secured to the outer side of the forward end of the chassis bar 5. The forward end of the cylindrical casing 8 is open while the rear end thereof is closed by a screw cap 11 having an enlarged opening in the end wall thereof. A two-part relatively adjustable and axially aligned shaft or rod comprising sections 12 and 13 is slidably mounted relative to the cylindrical casing 8, the shaft section 12 sliding within the casing 8 and projecting forwardly of the open front end of the casing while the shaft section 13 is disposed rearwardly of said casing with its forward end in abutting engagement with the screw cap 11.

The rear end of the shaft section 12 confined within the cylindrical casing 8 is of reduced diameter as shown at 14 and said reduced portion 14 has a washer 15 mounted thereon intermediate its ends that form an abutment for adjacent ends of coil springs 16 and 17 surrounding the shaft section 14 and engaged at their outer ends respectively with the shoulder 18 on the shaft section 12 and the cap nut 11. The rear terminal end of the reduced portion 14 of the shaft section 12 extends through the end opening in the screw cap 11 and is threaded as at 19 to be received in the threaded socket 20 in the forward end of the shaft section 13, the forward end of the shaft section 13 being of polygonal form as at 21 to take a wrench for adjustment thereof to vary the tension on the springs 16 and 17. Strap guides 22 are mounted on the chassis bar 5 for guiding the shaft section 13 in its movements. The rear end of the shaft section 13 has a reduced portion 23 with the terminal end thereof provided with an end opening threaded socket 24 for one part of a clevis connection 25 with a pin 26. The pin is slidable in a slotted yoke 27 provided with a reduced portion 28 directed toward the shaft section 13, while a coil spring 29 surrounds the reduced portion 23 of the shaft section 13, pin 26 and reduced portion 28 of the yoke 27 as shown in Figure 3.

The emergency brake shaft 30 extends transversely of the motor vehicle chassis as shown in Figure 1 and has the lever 31 fixed to the end thereof, one end of the lever having a pivotal connection 32 with the rear end of the yoke 27, while the other end of the lever 31 has a pivotal connection 33 with the emergency brake rod 34 that extends rearwardly to the brake B associated with the wheel on the rear axle 7.

The forward bumper bar 35 has a resilient slide connection with the forward ends of the shaft sections 12 at opposite sides of the chassis bars 5, each shaft section 12 being attached at its forward end as at 36 to a rectangular casing 37 telescoping in flanges 38 carried by the bumper bar 35. Top and bottom walls of the casing 37 are longitudinally slotted as at 39 and the vertical pin 40 extending between the flanges 38 extends through said casing slot 39 for guiding the bumper bar 35 in its telescoping movement on the casing 37. A coil spring 41 is interposed between the forward end of the casing 37 and bumper bar 35 for normally tensioning the bumper bar in a forward direction with the cooperating bars to normally occupy the relative positions illustrated in Figures 2 and 3.

A link and lever device 42 is operated by the emergency brake shaft 30 to effect release of the motor vehicle clutch.

The proper tension is initially placed on the springs 16, 17 and 29 to maintain the combination bumper and emergency brake mechanism against vibration during normal operation of the motor vehicle. The spring 17 offers the least resistance to compression as compared with the springs 41, 16 and 29, and in the event of a collision, the bumper bar 35 is moved in a direction toward the chassis bars 5 of the motor vehicle, this action initially compressing spring 17 and thereafter compressing the springs 41, 16 and 29, the two-part shaft compressing the sections 12 and 13 being moved rearwardly for further compression of the spring 29 and movement of the yoke 27 for moving the lever 31 and emergency brake shaft 30, the rod 34 making application of the brakes B associated with the rear wheels while the link and lever device 42 effects a release of the motor vehicle clutch. The brakes are applied in an easy manner and under a cushioning influence from the several spring devices with the idea of a quick application of the brake in an efficient manner and for reducing to a minimum damage to the motor vehicle and injury to the occupants thereof.

The rear bumper bar 35a is constructed similar to the front bumper bar 35 and includes a shaft 12a working in a cylindrical casing 8a clamped in any suitable manner to the rear axle 7 with the casing 8a containing the spring devices as described in connection with the showing in Figure 3, while the shaft 12a has a nut 21a attached thereto for varying the tension on the spring.

From the above detailed description, of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

1. In a combination bumper and brake operating mechanism for motor vehicles, emergency brake operating mechanism supported on the side chassis bars of the motor vehicle, a bumper bar attached to the forward ends of the brake operating mechanism, the brake operating mechanism including a two-part shaft, a guide cylinder for the forward part of the shaft, a pair of coil springs associated with the forward part of the shaft within the guide cylinder, an adjustable connection between the shaft parts operable for varying the tension of the springs, a rod connection between one shaft part and a wheel brake and a resilient connection between the bumper bar and forward end of the forward shaft part.

2. In a combination bumper and brake operating mechanism for motor vehicles, emergency brake operating mechanism supported on the side chassis bars of the motor vehicle, a bumper bar attached to the forward ends of the brake operating mechanism, the brake operating mechanism including a two-part shaft, a guide cylinder for the forward part of the shaft, a pair of coil springs associated with the forward part of the shaft within the guide cylinder, an adjustable connection between the shaft parts operable for varying the tension on the springs, a rod connection between one shaft part and a wheel brake and a resilient connection between the bumper bar and forward end of the forward shaft part, and a clutch operating link and lever device operated by the emergency brake operating mechanism.

3. In a combination bumper and brake operating mechanism for motor vehicles, emergency brake operating mechanism supported on the side chassis bars of the motor vehicle, a bumper bar attached to the forward ends of the brake operating mechanism, the brake operating mechanism including a two-part shaft, a guide cylinder for the forward part of the shaft, a pair of coil springs associated with the forward part of the shaft within the guide cylinder, an adjustable connection between the shaft parts operable for varying the tension on the springs, a rod connection between one shaft part and a wheel brake and a resilient connection between the bumper bar and forward end of the forward shaft part, and a clutch operating link and lever device operated by the emergency brake operating mechanism.

4. In a combination bumper and brake operating mechanism for motor vehicles, emergency brake operating mechanism supported on the side chassis bars of the motor vehicle, a bumper bar attached to the forward ends of the brake operating mechanism, the brake operating mechanism including a two-part shaft, a guide cylinder for the forward part of the shaft, a pair of coil springs associated with the forward part of the shaft within the guide cylinder, an adjustable connection between the shaft parts operable for varying the tension on the springs, a rod connection between one shaft part and a wheel brake and a resilient connection between the bumper bar and forward end of the forward shaft part, the connection between the shaft part and wheel brake including a lever pivoted intermediate its ends with one end attached to the shaft part and the other end attached to the wheel brake.

5. In a combination bumper and brake operating mechanism for motor vehicles, emergency brake operating mechanism supported on the side chassis bars of the motor vehicle, a bumper bar attached to the forward ends of the brake operating mechanism, the brake operating mechanism including a two-part shaft, a guide cylinder for the forward part of the shaft, a pair of coil springs associated with the forward part of the shaft within the guide cylinder, an adjustable connection between the shaft parts operable for varying the tension on the springs, a rod connection between one shaft part and a wheel brake and a resilient connection between the bumper bar and forward end of the forward shaft part, a clutch operating link and lever device operated by the emergency brake mechanism, the connection between the shaft part and wheel brake including a lever pivoted intermediate its ends with one end attached to the shaft part and the other end attached to the wheel brake.

6. In a combination bumper and brake operating mechanism for motor vehicles, emergency brake operating mechanism supported on the side chassis bars of the motor vehicle, the brake operating mechanism at each side of the chassis including a cylinder fixed to the chassis bar and open at one end and closed at the other end by an apertured screw cap, a shaft having a reduced portion slidable in the cylinder and projecting through the apertured cap, a coil spring surrounding the reduced portion of the shaft, a bumper bar resiliently connected to the forward end of the shaft, a second shaft adjustably connected in axial alinement with the aforesaid shaft, brake devices and a resilient slide connection between the second shaft and brake devices.

7. In a combination bumper and brake operating mechanism for motor vehicles, emergency brake operating mechanism supported on the side chassis bars of the motor vehicle, the brake operating mechanism at each side of the chassis including a cylinder fixed to the chassis bar and open at one end and closed at the other end by an apertured screw cap, a shaft having a reduced portion slidable in the cylinder and projecting through the apertured cap, a coil spring surrounding the reduced portion of the shaft, a bumper bar resiliently connected to the forward end of the shaft, a second shaft adjustably connected in axial alinement with the aforesaid shaft, brake devices and a resilient slide connection between the second shaft and brake devices, and clutch releasing devices operated by the brake devices.

NICODEMO CAPOGRECO.